US009805502B2

(12) United States Patent
Jang et al.

(10) Patent No.: US 9,805,502 B2
(45) Date of Patent: Oct. 31, 2017

(54) RENDERING SYSTEM AND METHOD

(71) Applicant: SAMSUNG ELECTRONICS CO., LTD., Suwon-si, Gyeonggi-do (KR)

(72) Inventors: Gyeong Ja Jang, Seoul (KR); Sang Oak Woo, Anyang-si (KR); Seok Yoon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 474 days.

(21) Appl. No.: 13/728,408

(22) Filed: Dec. 27, 2012

(65) Prior Publication Data

US 2013/0222379 A1 Aug. 29, 2013

(30) Foreign Application Priority Data

Feb. 27, 2012 (KR) .......................... 10-2012-0019523

(51) Int. Cl.
*G06T 17/00* (2006.01)
*G06T 1/60* (2006.01)
(Continued)

(52) U.S. Cl.
CPC ................ *G06T 17/00* (2013.01); *G06T 1/60* (2013.01); *G09G 5/14* (2013.01); *G09G 5/363* (2013.01); *G09G 5/393* (2013.01); *G09G 5/395* (2013.01)

(58) Field of Classification Search
CPC ..................... G06T 1/60; G06T 11/001; G06T 2207/10016; G06T 7/0053; G06T 7/0059;
(Continued)

(56) References Cited

U.S. PATENT DOCUMENTS 5,430,841 A 7/1995 Tannenbaum
8,040,349 B1 * 10/2011 Danskin ........................ 345/421
(Continued)

FOREIGN PATENT DOCUMENTS

CN 101127125 A 2/2008
CN 101794456 A 8/2010
(Continued)

OTHER PUBLICATIONS

Chinese Office Action issued on Aug. 22, 2016, in counterpart Chinese Application No. 201310059861.2 (13 pages in English, 9 pages in Chinese).

(Continued)

*Primary Examiner* — James A Thompson
*Assistant Examiner* — Xilin Guo
(74) *Attorney, Agent, or Firm* — NSIP Law

(57) ABSTRACT

A rendering system and method. The rendering system may perform rendering using a rendering context stored in an internal memory. When a rendering context to be used is not available in the internal memory, the rendering system may load the rendering context to be used from an external memory into the internal memory. When an insufficient amount of storage space is available in the internal memory, storage space may be secured by selectively deleting a rendering context from the internal memory, and a requested rendering context stored in the external memory may be loaded into the internal memory.

20 Claims, 6 Drawing Sheets

(51) Int. Cl.
*G09G 5/14* (2006.01)
*G09G 5/36* (2006.01)
*G09G 5/393* (2006.01)
*G09G 5/395* (2006.01)

(58) Field of Classification Search
CPC ... G06T 1/20; H04N 19/176; G06F 17/30194; G06F 2212/7201; G06F 21/6218; G06F 2212/1016; G06F 3/0631; G06F 3/0653; G06F 11/076; G06F 11/3452; G06F 17/18; G06F 2212/455; G06F 2212/652; G06F 12/0246; G06F 12/0848; G06F 13/28; G06F 3/0656; G06F 11/3433; G06F 12/0871; G06F 12/0873; G06F 17/30902; G06F 2003/0691; G06F 9/30047; H04L 41/0823; H04L 65/4084; H04W 28/0278
See application file for complete search history.

(56) References Cited

U.S. PATENT DOCUMENTS

| | | | |
|---|---|---|---|
| 2003/0025695 A1* | 2/2003 | Morphet | 345/423 |
| 2004/0189650 A1 | 9/2004 | Deering | |
| 2006/0271781 A1* | 11/2006 | Murakawa | 713/168 |
| 2008/0018664 A1 | 1/2008 | Min et al. | |
| 2009/0046098 A1 | 2/2009 | Barone et al. | |
| 2010/0110083 A1 | 5/2010 | Paltashev et al. | |
| 2010/0266045 A1* | 10/2010 | Katzur | H04N 19/176 375/240.16 |
| 2011/0123127 A1* | 5/2011 | Mima et al. | 382/239 |
| 2011/0216069 A1 | 9/2011 | Keall et al. | |
| 2015/0145873 A1* | 5/2015 | Akenine-Moller et al. | 345/506 |

FOREIGN PATENT DOCUMENTS

| | | |
|---|---|---|
| JP | 2003/132347 | 5/2003 |
| JP | 2004/537129 | 12/2004 |
| JP | 2005/514711 | 5/2005 |
| JP | 2007/157155 | 6/2007 |
| JP | 2010/027050 | 2/2010 |
| JP | 2011/051141 | 3/2011 |
| JP | 2011/221941 | 11/2011 |
| KR | 10-2003-0005251 | 1/2003 |
| KR | 10-2003-0020367 | 3/2003 |
| KR | 10-2004-0072694 | 8/2004 |
| KR | 10-0762811 | 9/2007 |
| KR | 10-0793990 | 1/2008 |
| KR | 10-2011-0042872 | 4/2011 |
| WO | WO 2011/078858 A1 | 6/2011 |

OTHER PUBLICATIONS

Office Action issued Feb. 21, 2017 in corresponding Japanese Patent Application No. 2013-35983.

* cited by examiner

RENDERING SYSTEM AND METHOD

CROSS-REFERENCE TO RELATED APPLICATIONS

This application claims the priority benefit of Korean Patent Application No. 10-2012-0019523, filed on Feb. 27, 2012, in the Korean Intellectual Property Office, the disclosure of which is incorporated herein by reference.

BACKGROUND

1. Field

One or more embodiments relate to a rendering system and method, and more particularly, to a rendering system and method that may decrease data accesses and transfers between a rendering system and an external memory.

2. Description of the Related Art

When using a mobile device, for example, three-dimensional (3D) graphic data may be displayed for a user interface (UI), electronic-book (e-book) interfaces, and interfaces that demonstrate available products and/or respective features, e.g., as provided to a user while researching an available product on an Internet based store, as only examples.

Such displayed interfaces may use or require relatively fast renderings. To address these requirements, a tile based rendering scheme may be used, where the image to be rendered is divided into a plurality of tiles, an object to be displayed is determined and rendered for each tile.

According to such a tile based rendering scheme, a first rendering context is loaded from an external memory into internal memory for rendering a respective first tile, and then a second rendering context is loaded from the external memory into the internal memory to render a respective second tile.

However, rendering performance decreases when bandwidth between the external memory and the internal memory is relatively narrow or caused to be relatively narrow. Thus, the present inventors have found that bandwidth between external memory and internal memory may be a relatively important factor in enhancing rendering performance, or at least minimizing decreases in rendering performance.

SUMMARY

In one or more embodiments there is provided a rendering system based on a plurality of tiles for an image, the rendering system including a determiner to determine a total usage count for a respective target rendering context for rendering each tile of the plurality of tiles, a first updater to selectively load the respective target rendering context from an external memory into an internal memory, and a second updater to update a remaining usage count for the respective target rendering context in response to the selectively loaded target rendering context being used for rendering each respective tile.

The respective target rendering context may include at least one of texture information for rendering a target object corresponding to the respective target rendering context, information used for a pixel shader operation for the target object, and state information of a rasterizer for the target object.

The determiner may determine the total usage count for the respective target rendering context based on a number of tiles through which a target object corresponding to the respective target rendering context is displayed.

The first updater may determine whether a storage space large enough for loading the respective target rendering context is available in the internal memory, and load the respective target rendering context into the internal memory when the storage space is determined to be available. When the storage space is determined to not be available, the first updater may select and delete a rendering context, among other rendering contexts stored in the internal memory, from the internal memory based on a remaining usage count for the other rendering contexts, and load the respective target rendering context into the internal memory.

The first updater may select, as the rendering context to be deleted among the other rendering contexts, a rendering context having a value of "0" as a remaining usage count for the rendering context. The first updater may select, as the rendering context to be deleted among the other rendering contexts, a rendering context having a least remaining usage count for the rendering context.

The plurality of tiles of the image may be tiles configured for producing three-dimensional (3D) graphic data.

In one or more embodiments there is provided a rendering method based on a plurality of tiles for an image, the rendering method including determining a total usage count for a respective target rendering context for rendering each tile of the plurality of tiles, selectively loading the respective target rendering context from an external memory into an internal memory, and updating a remaining usage count for the respective target rendering context in response to the selectively loaded target rendering context being used for rendering each respective tile.

The respective target rendering context may include at least one of texture information for rendering a target object corresponding to the respective target rendering context, information used for a pixel shader operation for the target object, and state information of a rasterizer for the target object.

The determining may include determining the total usage count for the respective target rendering context based on a number of tiles through which a target object corresponding to the respective target rendering context is displayed.

Such a method may include determining whether a storage space large enough for loading the respective target rendering context is available in the internal memory, and may include loading the respective target rendering context into the internal memory when the storage space is determined to be available.

Such a method may include selecting and deleting a rendering context, among other rendering contexts stored in the internal memory, from the internal memory based on a remaining usage count for the other rendering contexts when the storage space is determined to not be available, and may include loading the respective target rendering context into the internal memory after the deleting of the rendering context.

The deleting may include selecting, as the rendering context to be deleted among the other rendering contexts, a rendering context having a value of "0" as a remaining usage count for the rendering context. The deleting may include selecting, as the rendering context to be deleted among the other rendering contexts, a rendering context having a least remaining usage count for the rendering context.

In such a method, the plurality of tiles of the image may be tiles configured for producing three-dimensional (3D) graphic data.

In one or more embodiments there is provided a rendering method based on a plurality of tiles for an image, the rendering method including determining a total usage count for a respective target rendering context for rendering each tile of the plurality of tiles, determining whether storage space is available in an internal memory for loading the respective target rendering context into the internal memory, and selecting and deleting a rendering context, among other rendering contexts stored in the internal memory, from the internal memory based on a determined remaining usage count for the other rendering contexts, when the storage space is determined to not be available.

The determining of the total usage count may include determining the total usage count for the respective target rendering context based on a number of tiles through which a target object corresponding to the respective target rendering context is displayed.

Such a method may include determining whether a storage space large enough for loading the respective target rendering context is available in the internal memory, and may include loading the respective target rendering context into the internal memory when the storage space is determined to be available.

The loading may include loading the respective target rendering context into the internal memory after the deleting of the rendering context. The deleting may include selecting, as the rendering context to be deleted among the other rendering contexts, a rendering context having a value of "0" as a remaining usage count for the rendering context. The deleting may include selecting, as the rendering context to be deleted among the other rendering contexts, a rendering context having a least remaining usage count for the rendering context.

In such a method, the plurality of tiles of the image may be tiles configured for producing three-dimensional (3D) graphic data.

According to one or more embodiments, it may be possible to effectively use a bandwidth between an internal memory and an external memory.

According to one or more embodiments, it may be possible to decrease a number of instances at which a rendering system loads a rendering context that is stored in an external memory.

Additional aspects, features, and/or advantages of one or more embodiments will be set forth in part in the description which follows and, in part, will be apparent from the description, or may be learned by practice of the one or more embodiments.

BRIEF DESCRIPTION OF THE DRAWINGS

These and/or other aspects will become apparent and more readily appreciated from the following description of one or more embodiments, taken in conjunction with the accompanying drawings of which.

DETAILED DESCRIPTION

Figure 1:
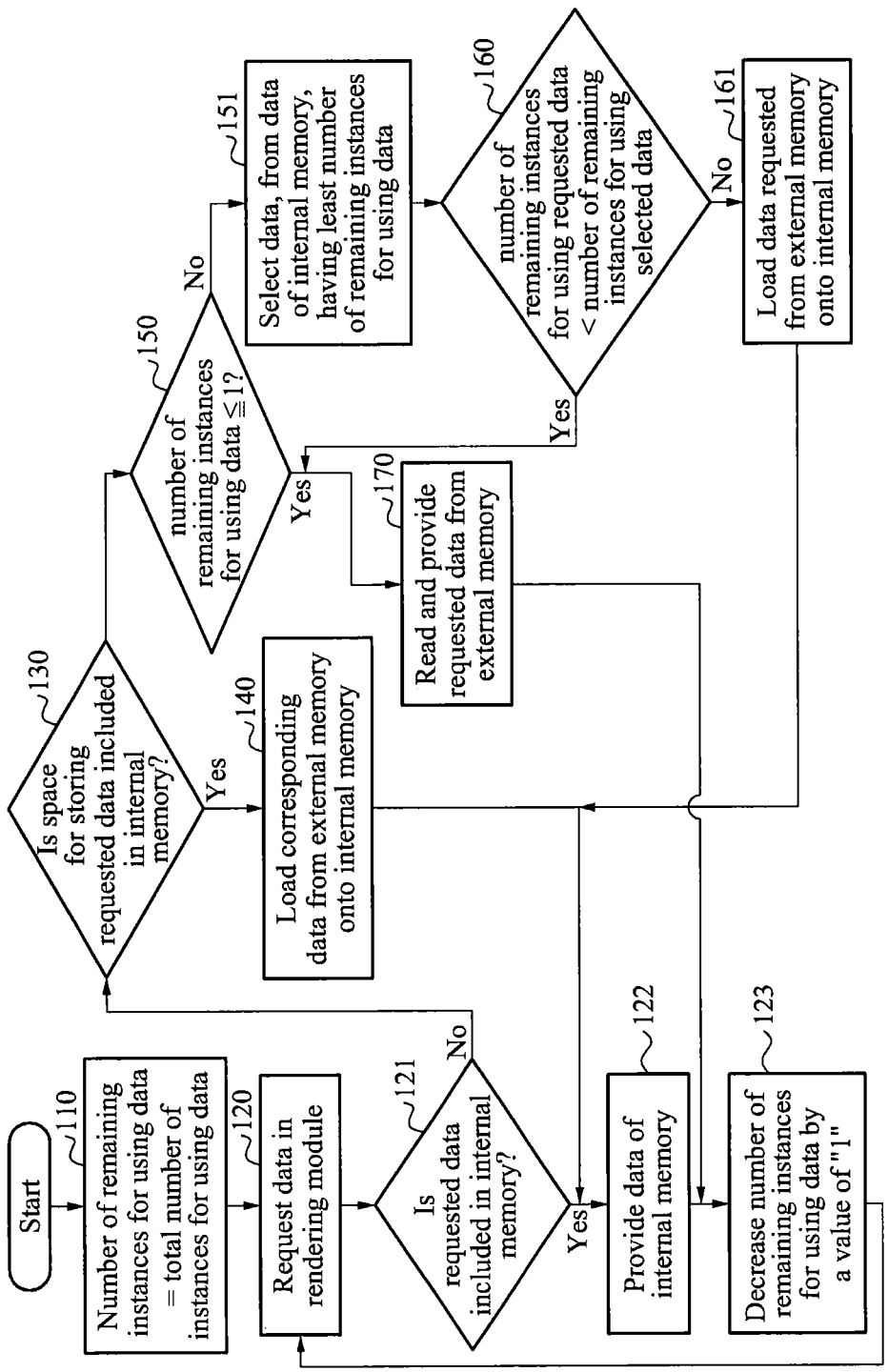
FIG. 1 illustrates a rendering method, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 illustrates a rendering method, according to one or more embodiments.

In operation 110, a rendering system may determine a total usage count for data, such as determining a total number of uses of rasterizer operation information. Here, such information used for a rasterizer operation may be used as data in operation 110. According to one or more embodiments, the information used for a rasterizer operation may include at least one of texture information for rendering a target object, information used for a pixel shader operation for the target object, and state information of a rasterizer for the target object, as only examples.

Here, the rasterizer may perform, such as by using a data structure, an operation for a target object. In this instance, the data structure may include texture image information, tile information, and scene buffer information, as only examples. The rasterizer may perform, using a rasterizer state, and the like, an operation for a target object. In this instance, as only an example, the rasterizer state may include a rasterizer setting and a setting of a fragment operation.

A pixel shader for a target object may perform an operation for the target object using information for the pixel shader operation including at least one of a pointer of a shader program, a shader context, a variable of the shader program (that is, a varying variable), a uniform variable, a pixel shader operation function, fragment information corresponding to a result of the pixel shader operation.

Here, the varying variable may include at least one of position information, texture information, color information, normal information, tangent information, binormal information, view information, and light information, as only examples.

Hereinafter, the term "data" may be used in conjunction with a term "context." Accordingly, the total usage count for data may be determined based on a number, for example, of tiles through which an object corresponding to the data is displayed. For example, when an object corresponding to data is expressed through four tiles, the object may be expressed by being divided into four tiles. Thus, when each of the four tiles is rendered, the corresponding data may be used. In this instance, a total usage count for the corresponding data may be determined to be four, noting that alternatives are available.

In operation 110, a rendering system may determine a remaining usage count for data that is to be used for performing the desired rendering. When rendering of data is not performed before operation 110, for example, the rendering system may set the remaining usage count for data to be same as a total usage count for the data for rendering of plural tiles, for example.

In operation 120, a rendering module of the rendering system may request data to render a determined tile.

According to one or more embodiments, data may be stored in one or more external storage devices, e.g., one or more external memories. Data stored in an external memory may be loaded into one or more internal storage devices, e.g., one or more internal memories, and then the rendering module may perform rendering using data loaded into internal memory from external memory.

In operation 121, the rendering system may determine whether requested data is available in the internal memory. When the corresponding data is used to render a previous tile, the requested data may have already been loaded in the internal memory.

When the corresponding data is already available in the internal memory, the rendering system may provide the corresponding data to the rendering module, in operation 122.

In operation 123, the rendering system may then perform rendering using the corresponding data. When data is or has been used for rendering, the rendering system may decrease a remaining usage count for the corresponding data by a value of "1," for example.

When, in operation 121, it is determined that the requested data is not already available in the internal memory, the rendering system may determine whether a storage space large enough for storing the requested data, e.g., upon loading from an external memory, is available in the internal memory, in operation 130.

When the storage space of the internal memory is determined to be large enough for storing the requested data, the rendering system may load the requested data from the external memory into the internal memory, in operation 140. The rendering system may then perform rendering using loaded data, in operations 122 and 123.

When there is insufficient storage space in the internal memory for storing the requested data, the rendering system may secure a storage space in the internal memory for the requested data by deleting a portion of other data previously loaded into the internal memory, e.g., for a previous rendering.

According to one or more embodiments, the rendering system may select and delete rendering based data that is determined to be relatively less likely to be used for future or near upcoming renderings, compared to other rendering based data available in the internal memory that may be determined to be relatively more likely to be used for future or near upcoming renderings.

According to one or more embodiments, the rendering system may set and control a remaining usage count for all data, in which case, the rendering system may determine that data having a least usage count is data that is less likely to be used for such future or upcoming renderings, select that least usage count data, and then delete the selected data.

In operation 150, the rendering system may determine whether a remaining usage count for requested data is less than or equal to a value of "1," for example. In such an embodiment, when the remaining usage count for requested data is less than or equal to a value of "1," the rendering system may determine that the requested data may be used for a single current instance. In this case, in operation 170, the rendering system may merely provide the requested data stored from the external memory to the rendering module, and not store the requested data in the internal memory, effectively bypassing a local storing of the requested data in internal memory, e.g., to preserve the availability of more likely to be used rendering based data in internal memory by not having to delete currently stored internal memory stored data to make room for the newly requested data.

As only an example, when the remaining usage count for requested data is greater than a value of "1," the rendering system may determine that the requested data is to be used for a plurality of instances. In this example, the requested data may be stored in the internal memory to enhance performance. In operation 151, the rendering system may select data, from data in the internal memory, having a least remaining usage count for the data.

In operation 160, the rendering system may compare a remaining usage count for the requested data to a remaining usage count for the selected data, e.g., by comparing the number of remaining usage count for the requested data to the number of remaining usage count for the selected data. When the remaining usage count for the requested data is less than the remaining usage count for the selected data, the rendering system may not store, in the internal memory, data stored in the external memory, and may merely provide the requested data to the rendering module, in operation 170.

When the remaining usage count for the requested data is greater than or equal to the remaining usage count for the selected data, the rendering system may load, into the internal memory, data requested from the external memory, in operation 161.

Figure 2:
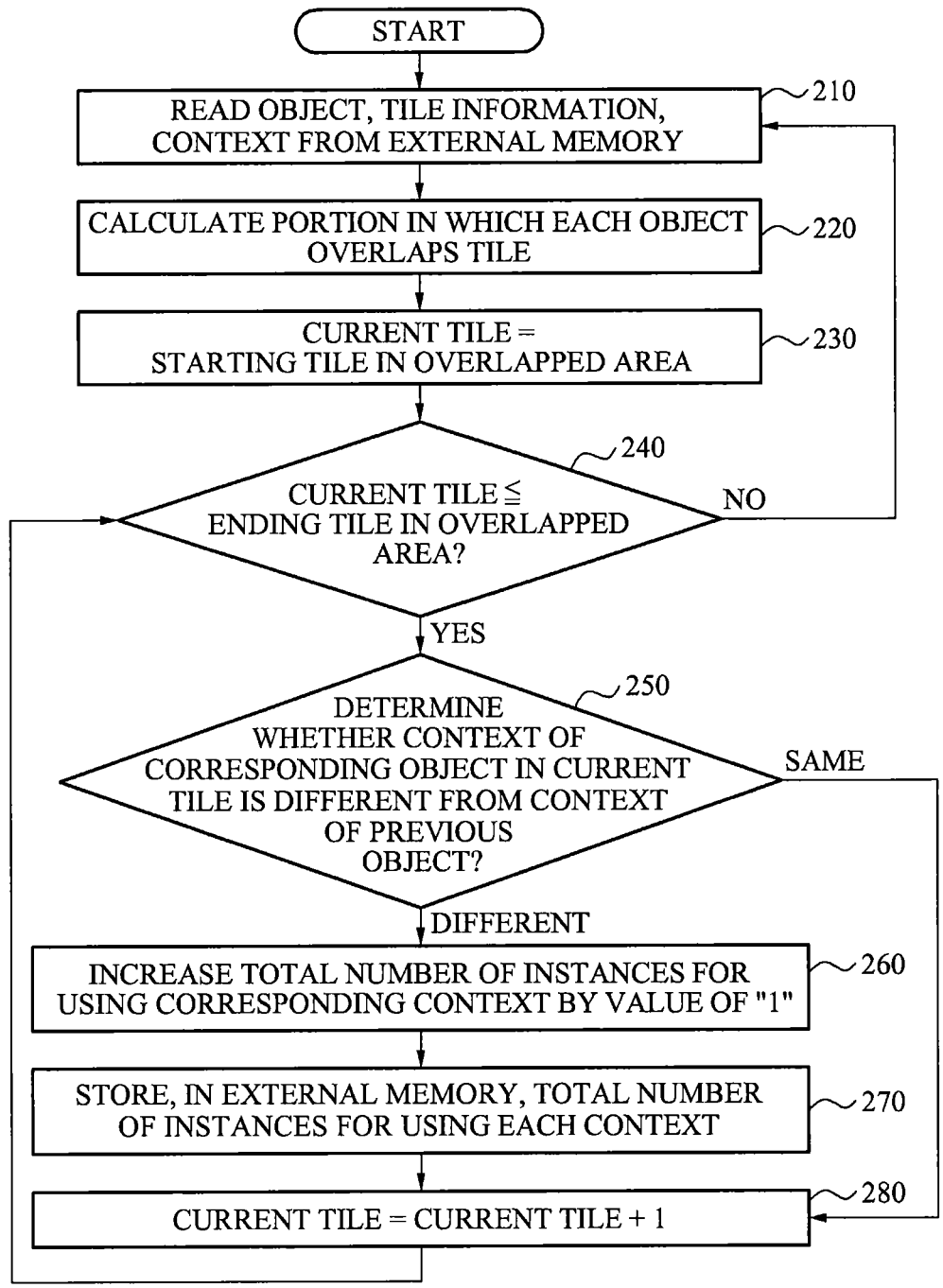
FIG. 2 illustrates a method of setting a total usage count for a rendering context, according to one or more embodiments.
Figure 3:
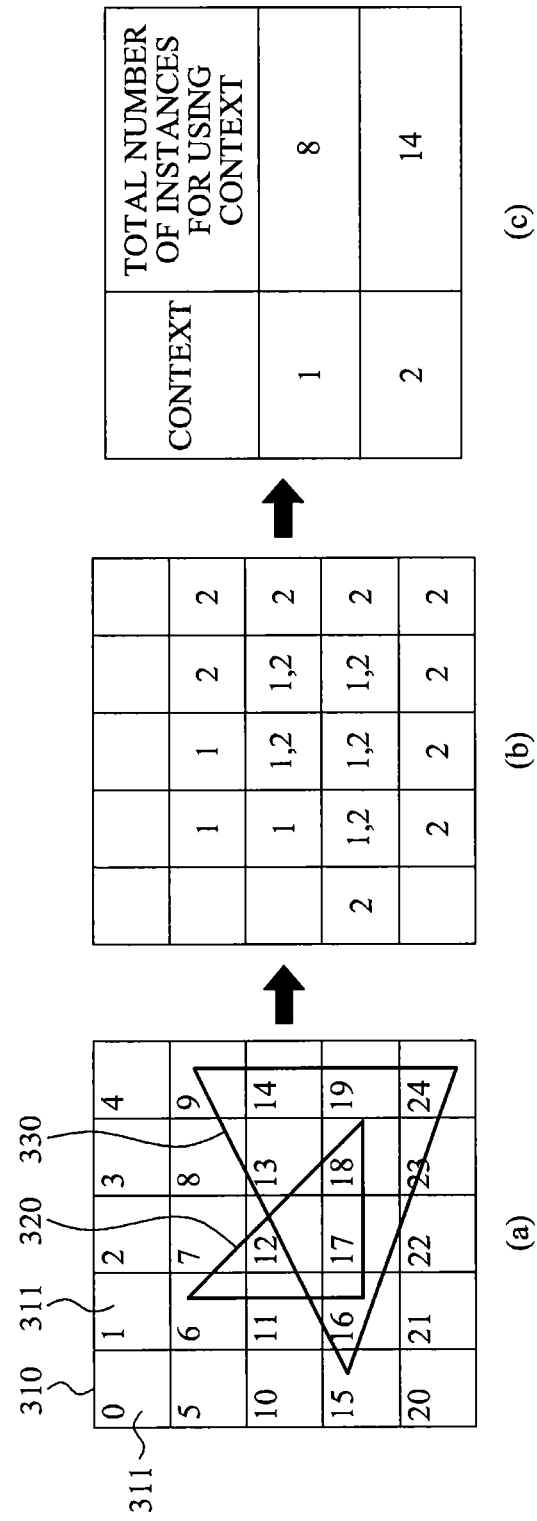
FIG. 3 illustrates a method of setting a total usage count for a rendering context, according to one or more embodiments.

FIG. 2 illustrates a method of setting a total usage count for a rendering context, according to one or more embodiments, and illustrations (a)-(c) of FIG. 3 illustrate a method of setting a total usage count for a rendering context, according to one or more embodiments.

In operation 210, a rendering system may read, from an external memory, e.g., one or more external memories, an object, tile information, and rendering context information, as only examples. Here, the rendering context information may include at least one of texture information for rendering an object, position information, normal information, and rendering state information, noting alternatives are available.

In operation 220, the rendering system may calculate a portion of a rendering image in which each object overlaps a tile. According to one or more embodiments, referring to illustration (a) of FIG. 3, the rendering system may divide a rendering image 310 into a plurality of tiles 311. Illustration (a) of FIG. 3 demonstrates an example in which a rendering image is divided into 25 tiles, as only an example. The rendering image 310 may include at least one object, for example, a first object 320 and a second object 330. The at least one object may be displayed through at least one tile, as demonstrated in illustration (a) of FIG. 3.

Illustration (b) of FIG. 3 demonstrates that a portion in which each object overlaps each tile being calculated. In such an embodiment, a number recorded in each tile may indicate an identification number of an object overlapping each tile. An identification number 1, for example, recorded in a tile may indicate that the first object 320 is displayed on the corresponding tile, and an identification number 2 may indicate that the second object 330 is displayed on the corresponding tile.

In operation 230, the rendering system may set a value of a current tile to a starting tile in an area where an object overlaps a tile.

In operation 240, the rendering system may determine whether the value of the current tile corresponds to an ending tile of the area where the object overlaps the tile.

When the current tile corresponds to the ending tile, the rendering system may perform an operation for another object, in operation 210.

When the current tile fails to correspond to the ending tile, the rendering system may determine whether a rendering context of the corresponding object in the current tile is different from a rendering context of a previous object, in operation 250. When the rendering contexts are the same, the rendering system may merely again use the rendering context of the previous object that is already available, e.g., previously loaded for a previous rendering, in an internal memory, e.g., one or more internal memories, and thus, a total usage count for the corresponding rendering context may not be increased, and an operation for another tile may be performed by increasing a value of the current tile, in operation 280.

When the rendering context of the corresponding object is different from that of the rendering context of a previous object, e.g., the previous object, the rendering system may load a rendering context into the internal memory from the external memory. Thus, in operation 260, the rendering system may increase a total usage count for corresponding rendering context by value of "1."

In operation 270, the rendering system may store, in the external memory, a total usage count for each rendering context.

A performance of operations 230 through 280 may correspond to adding up all numbers of objects illustrated in illustration (b) of FIG. 3. That is, such a performance may correspond to obtaining a number of tiles through which each object is displayed in illustration (b) of FIG. 3.

Referring to illustrations (a) and (b) of FIG. 3, the first object 320 may be displayed through eight tiles, and the second object 330 may be displayed through fourteen tiles, which may be summarized in illustration (c) of FIG. 3, as only examples.

Figure 4:
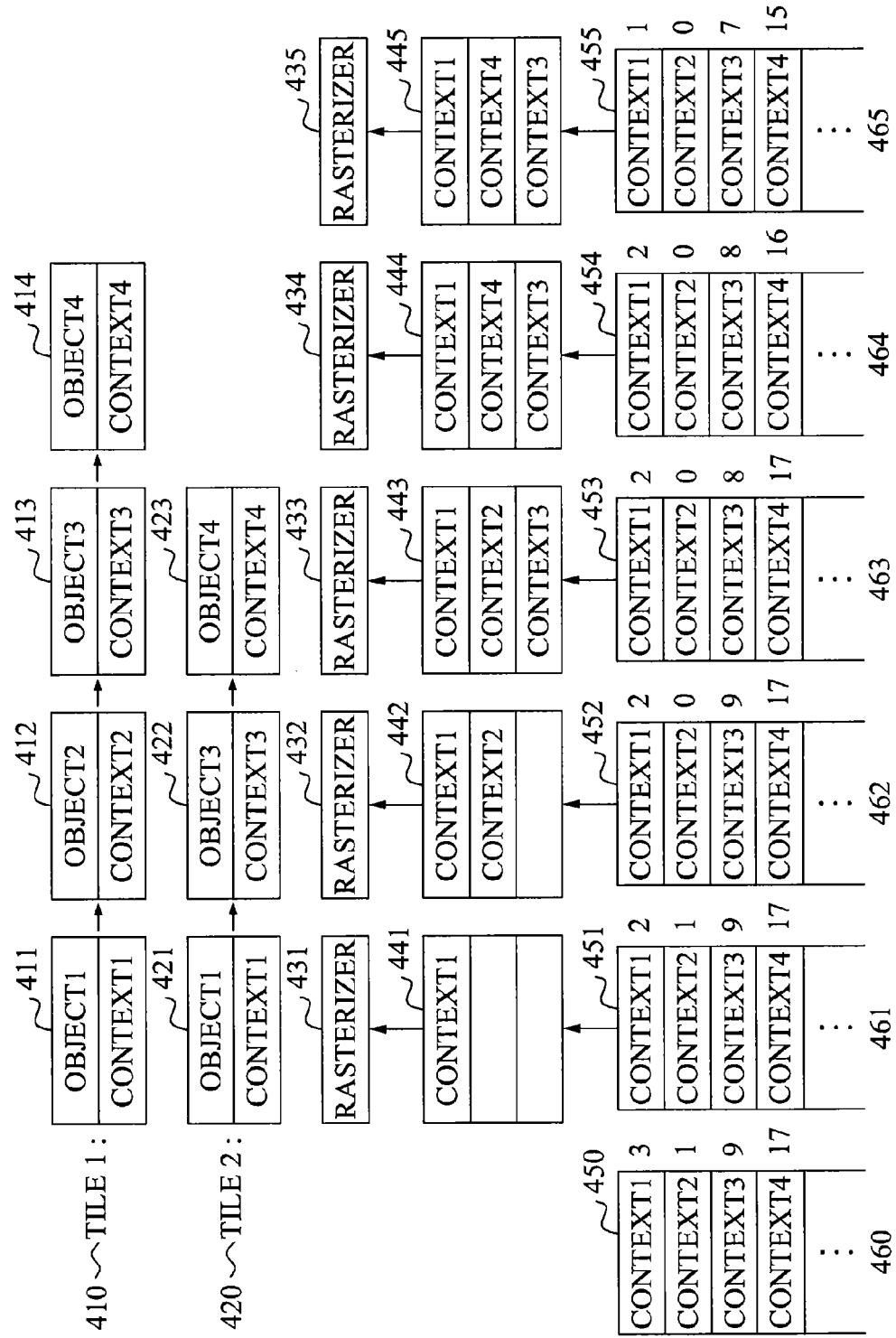
FIG. 4 illustrates a rendering method, according to one or more embodiments.

FIG. 4 illustrates a rendering method, according to one or more embodiments.

Referring to rendering information 410 for a first tile, four objects may be displayed in the first tile, as only an example. Referring to rendering information 411, 412, 413, and 414 for each object, each object may be rendered using a rendering context matching the corresponding object.

Referring to rendering information 420 for a second tile, three objects may be displayed in the second tile. Referring to rendering information 421, 422, and 423 for each object, each object may be rendered using a rendering context that matches the corresponding object.

In operation 460, information about all rendering contexts may be stored in an external memory 450. A number recorded beside each rendering context may indicate a number of remaining instances for each rendering context to be used.

In operation 461, a rendering system may load a first rendering context into an internal memory 441. A rasterizer 431 may use the loaded first rendering context for rendering a first object in the first tile. In this instance, a remaining usage count for a first rendering context of an external memory 451 may decrease to a value of "2."

In operation 462, the rendering system may load a second rendering context into an internal memory 442. A rasterizer 432 may use the loaded second rendering context for rendering a second object in the first tile. In this instance, a remaining usage count for a second rendering context of an external memory 452 may decrease to a value of "0."

In operation 463, the rendering system may load a third rendering context into an internal memory 443. A rasterizer 433 may use the loaded third rendering context for rendering a third object in the first tile. In this instance, a remaining usage count for a third rendering context of an external memory 453 may decrease to a value of "8."

In operation 464, the rendering system may render a fourth object in the first tile. The rendering system may desire to load a fourth rendering context to render the fourth object when an internal memory 444 has no available storage space. In this instance, the rendering system may delete at least one of the first rendering context, the second rendering context, and the third rendering context stored in the internal memory 444.

According to one or more embodiments, the rendering system may select at least one rendering context among rendering contexts stored in the internal memory 444 based on a remaining usage count for each rendering context, and delete the at least one selected rendering context.

According to one or more embodiments, the rendering system may select and delete a rendering context, among rendering contexts stored in the internal memory 444, having a value of "0" as a remaining usage count for the rendering context. According to one or more embodiments, the rendering system may select and delete a rendering context, among rendering contexts stored in the internal memory 444, having a least remaining usage count for the rendering context.

Referring to FIG. 4, the rendering system may delete the second rendering context among rendering contexts stored in the internal memory 444. A remaining usage count for the second rendering context may correspond to a value of "0," which may be smallest among the first rendering context, the second rendering context, and the third rendering context.

According to one or more embodiments, the rendering system may load the fourth rendering context into a storage space secured by deleting the second rendering context. A rasterizer 434 may use the loaded fourth rendering context for rendering the fourth object in the first tile. In this instance, a remaining usage count for the fourth rendering context of an external memory 454 may decrease to a value of "16."

In operation 465, a rasterizer 435 may render, using a first rendering context, a third rendering context, and a fourth rendering context loaded into an internal memory 445, a first object, a third object, and a fourth object in a second tile. In this instance, a remaining usage count for the first rendering context of an external memory 455 may decrease to a value of "1," a remaining usage count for the third rendering context may decrease to a value of "7," and a remaining usage count for the fourth rendering context may decrease to a value of "15."

In operation 465, since all rendering contexts for rendering the second tile may have been loaded into a memory, e.g., an internal memory, the rendering system may not access the external memory 455, and may not load a rendering context from an external memory to the internal memory, but merely forward the rendering context without storing in the internal memory. Thus, a bus from an external memory to an internal memory may be effectively used, and be configured to permit such selection of whether to store a requested rendering context in the internal memory.

Figure 5:
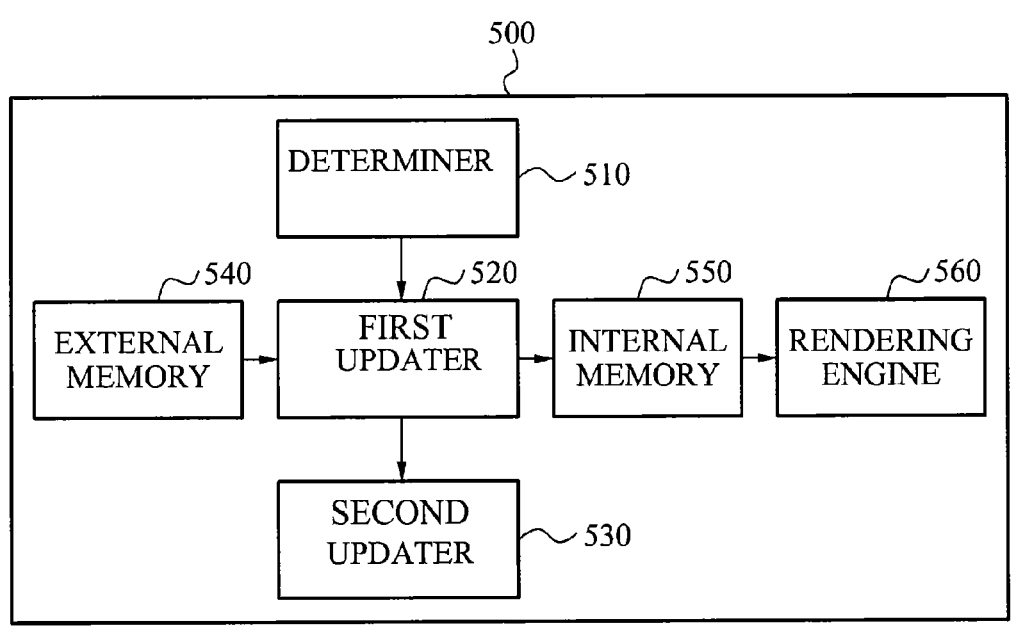
FIG. 5 illustrates a configuration of a rendering system, according to one or more embodiments.

FIG. 5 illustrates a configuration of a rendering system, according to one or more embodiments.

A rendering system 500 may include a determiner 510, a first updater 520, a second updater 530, an external memory 540, an internal memory 550, and a rendering engine 560.

The rendering system 500 may divide a rendering image in a divider, and perform rendering for each tile. The rendering system 500 may use a rendering context to render an object. Here, the rendering context may include at least one of texture information for rendering a target object, information used for a pixel shader operation for the target object, and state information of a rasterizer for the target object, for example.

The determiner 510 may determine a total usage count for a target rendering context for rendering each tile. According to one or more embodiments, the determiner 510 may determine the total usage count for the target rendering context based on a number of tiles, among tiles obtained by dividing the rendered image, through which a target object corresponding to the target rendering context is displayed. For example, when the target object corresponding to the target rendering context is displayed through three tiles, the determiner 510 may determine the total usage count for the target rendering context to be three.

The target rendering context may be stored in the external memory 540.

The first updater 520 may load, into an internal memory, the target rendering context stored in the external memory 540, and the rendering engine 560 may render the target object using the target rendering context loaded into the internal memory.

The rendering engine 560 and the internal memory 550 are illustrated as separate elements hardware in FIG. 5. However, according to one or more embodiments, the rendering engine 560 and the internal memory 550 may be embodied as a single element of hardware, e.g., distinguished from an element of hardware of the external memory. For example, the rendering engine 560 may correspond to an operator part of a central processing unit (CPU), and the internal memory 550 may correspond to a memory within the CPU. Thus, with the internal memory the bandwidth may be relatively wide, and a loading speed may be relatively fast between the rendering engine 560 and the internal memory 550, while the bandwidth and loading speed between the external memory 540 and the CPU may be respectively relatively narrow and slow.

According to one or more embodiments, the first updater 520 may determine whether a storage space large enough for loading the target rendering context is available in the internal memory 550, and load the target rendering context into the internal memory 550 when the storage space is available. That is, when other rendering contexts for rendering other objects are loaded into the internal memory 550, a sufficient amount of storage space may not be available in the internal memory 550. In this instance, the first updater 520 may fail to load the target rendering context into the internal memory 550.

The second updater 530 may update a remaining usage count for the target rendering context in response to the target rendering context loaded into the internal memory 550 being used for rendering each tile. That is, when the target rendering context is initially loaded into the internal memory 550, a remaining usage count for the target rendering context may be determined to be the same as a total usage count for the target rendering context. When the target rendering context is used for rendering a first tile, the second updater 530 may update the remaining usage count for the target rendering context to a value less than a previous number of instances by a value of "1." When the target rendering context is used for rendering a second tile, the second updater 530 may update the remaining usage count for the target rendering context to a value less than a previous number of instances by a value of "1." The second updater 530 may update the remaining usage count for the target rendering context until the number reaches a value of "0" in a similar scheme.

According to one or more embodiments, the first updater 520 may select a rendering context, among a plurality of rendering contexts loaded into the internal memory 550, to be deleted from the internal memory 550 based on a remaining usage count for each rendering context.

In response to the first updater 520 deleting a selected rendering context, a storage space large enough for loading the target rendering context may be secured in the internal memory 550. In this instance, the first updater 520 may load the target rendering context into the secured storage space, and the rendering engine 560 may perform rendering using the loaded target rendering context.

According to one or more embodiments, the first updater 520 may select and delete a rendering context, among rendering contexts stored in the internal memory 550, having a value of "0" as a remaining usage count for the rendering context.

According to one or more embodiments, the first updater 520 may select and delete a rendering context, among rendering contexts stored in the internal memory 550, having a least remaining usage count for the rendering context.

Figure 6:
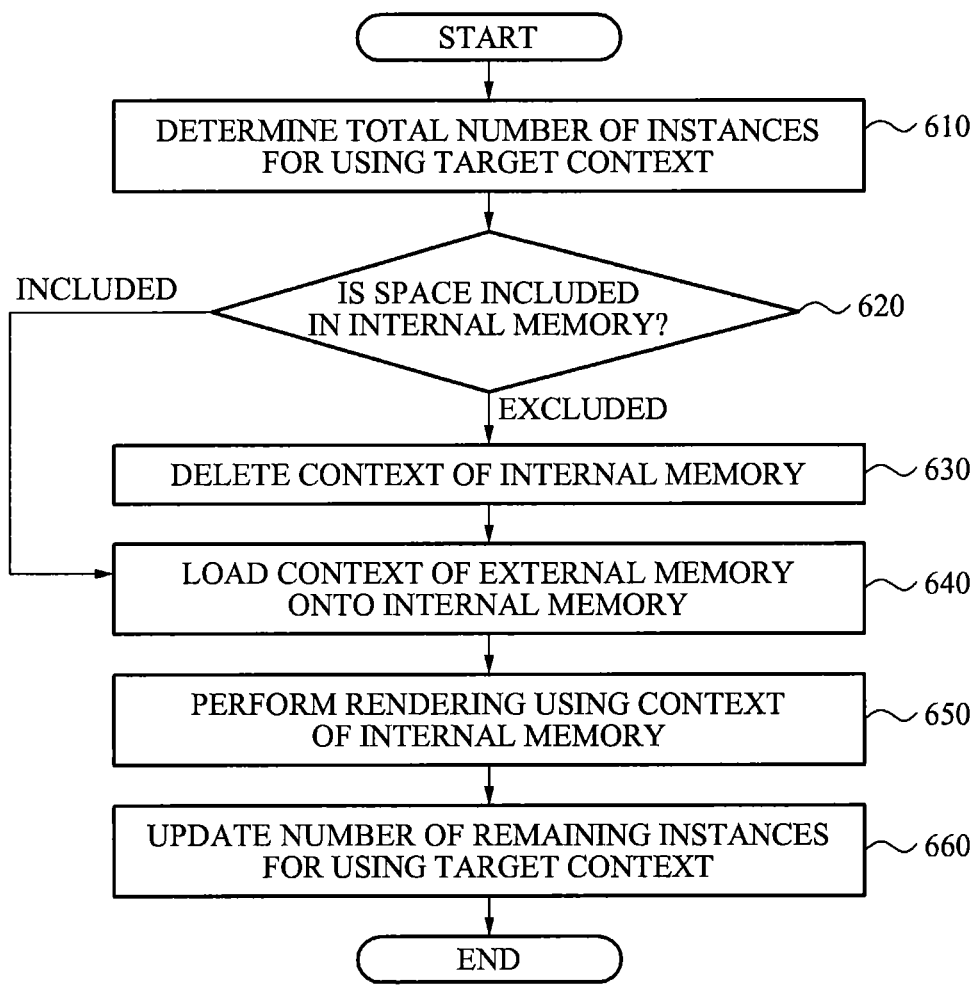
FIG. 6 illustrates a rendering method, according to one or more embodiments.

FIG. 6 illustrates a rendering method, according to one or more embodiments.

A rendering system may divide a rendering image in a divider, and perform rendering for each tile. The rendering system may use a rendering context to render an object. Here, the rendering context may include at least one of texture information for rendering a target object, information used for a pixel shader operation for the target object, and state information of a rasterizer for the target object, for example. In operation 610, the rendering system may determine a total usage count for a target rendering context for rendering each tile. According to one or more embodiments, the rendering system may determine the total usage count for the target rendering context based on a number of tiles, among tiles obtained by dividing the rendering image, through which the target object corresponding to the target rendering context is displayed.

The target rendering context may be stored in an external memory.

In operation 620, the rendering system may determine whether a storage space large enough for loading the target rendering context is available in an internal memory. When the storage space large enough for loading the target rendering context is available, the rendering system may load the target rendering context into the internal memory in operation 640.

When other rendering contexts for rendering other objects are determined to be loaded into the internal memory, there may actually be insufficient storage space available in the internal memory. In this instance, the rendering system may fail to load the target rendering context into the internal memory. In this instance, in operation 630, the rendering system may select and delete a portion of rendering contexts among rendering contexts stored in the internal memory.

According to one or more embodiments, the rendering system may select and delete a rendering context, among a plurality of rendering contexts loaded into the internal memory, to be deleted from the internal memory based on a usage count for each rendering context.

According to one or more embodiments, the rendering system may select and delete a rendering context, among a plurality of rendering contexts loaded into the internal memory, having a value of "0" as a remaining usage count for the rendering context.

According to one or more embodiments, the rendering system may select a rendering context, among a plurality of rendering contexts loaded into the internal memory, having a least remaining usage count for the rendering context.

In response to the rendering system deleting a selected rendering context, a storage space for loading the target rendering context may be secured in the internal memory. In this instance, the rendering system may load the target rendering context into the secured storage space, in operation 640.

In operation 650, the rendering system may perform rendering using the loaded target rendering context.

In operation 660, the rendering system may update a remaining usage count for the target rendering context in response to the target rendering context loaded into the internal memory being used for rendering each tile. That is, when the target rendering context is initially loaded into the internal memory, a remaining usage count for the target rendering context may be determined to be the same as a total usage count for the target rendering context. When the target rendering context is used for rendering a first tile, the rendering system may update the remaining usage count for the target rendering context to a value less than a previous number of instances by a value of "1." When the target rendering context is used for rendering a second tile, the rendering system may update the remaining usage count for the target rendering context to a value less than a previous number of instances by a value of "1." The rendering system may update the remaining usage count for the target rendering context until the number reaches a value of "0" in a similar scheme.

In one or more embodiments, any apparatus, system, element, or interpretable unit descriptions herein include one or more hardware devices or hardware processing elements. For example, in one or more embodiments, any described apparatus, system, element, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:
1. A tile based rendering system comprising:
   a determiner configured to determine, for an image divided into tiles a first usage count of the tiles for which a first rendering context is used for rendering the image, the first rendering context specifying information to render a first object in the image, wherein the first usage count is set to be a value of total usage count for the first rendering context;
   a first updater configured to load the first rendering context from an external memory into an internal memory based on whether the first usage count is larger than a second usage count corresponding to data in the internal memory;
   a rendering engine configured to render a first tile of the image using the first rendering context, the first rendering context being provided by the internal memory in response to the first rendering context being loaded into the internal memory, and the first rendering context being provided being provided by the external memory in response to the first rendering context not being loaded into the internal memory; and
   a second updater configured to update the first usage count in response to a number of the tiles for which the first rendering context has been used to render the image, the first usage count being decreased each time the first rendering context is used to render the image.
2. The rendering system of claim 1, wherein the first rendering context comprises at least one of texture information for rendering the first object, information used for a pixel shader operation for the first object, and state information of a rasterizer for the first object.

3. The rendering system of claim 1, wherein the determiner is further configured to determine the first usage count based on a number of the tiles that the first object overlaps.

4. The rendering system of claim 1, wherein the first updater is further configured to determine whether a storage space large enough for loading the first rendering context is available in the internal memory, and to load the first rendering context into the internal memory in response to the determination that the storage space is available.

5. The rendering system of claim 4, wherein
the determiner is further configured to determine the second usage count of the tiles for which a second rendering context is used for rendering the image, the second rendering context specifying information to render a second object in the image, wherein the second usage count is set to be a value of total usage count for the second rendering context;
the second updater is further configured to update the second usage count in response to a number of the tiles for which the second rendering context has been used to render the image, the second usage count being decreased each time the second rendering context is used to render the image;
the determiner is further configured to determine a third usage count of the tiles for which a third rendering context is used for rendering the image, the third rendering context specifying information to render a third object in the image, wherein the third usage count is set to be a value of total usage count for the third rendering context;
the second updater is further configured to update the third usage count in response to a number of the tiles for which the third rendering context has been used to render the image, the third usage count being decreased each time the third rendering context is used to render the image;
the first updater is further configured to delete the second rendering context, when the second and third rendering contexts are stored in the internal memory, from the internal memory based the second usage count and the third usage count in response to the determination that the storage space is not available, and to load the first rendering context into the internal memory in response to the deletion of the second rendering content from the internal memory.

6. The rendering system of claim 5, wherein the first updater is further configured to select the second rendering context for deletion based on the second usage count having a value of "0".

7. The rendering system of claim 5, wherein the first updater is further configured to select the second rendering context for deleting based on the second usage count being less than the third usage count.

8. The rendering system of claim 1, wherein the plurality of objects specify three-dimensional (3D) graphic data.

9. A method for tile based rendering of an image, the method comprising:
determining, where an image is divided into tiles, a first usage count of the tiles for which a first rendering context is used for rendering the image, the first rendering context specifying information to render a first object in the image, wherein the first usage count is set to be a value of total usage count for the first rendering context;
loading the first rendering context from an external memory into an internal memory based on whether the first usage count is larger than a second usage count corresponding to data in the internal memory;
rendering a first tile of the image using the first rendering context, the first rendering context being provided by the internal memory in response to the first rendering context being loaded into the internal memory, and the first rendering context being provided by the external memory in response to the first rendering context not being loaded into the internal memory; and
updating the first usage count in response to a number of the tiles for which the first rendering context has been used to render the image, the first usage count being decreased each time the first rendering context is used to render the image.

10. The method of claim 9, wherein the first rendering context comprises at least one of texture information for rendering the first object, information used for a pixel shader operation for the first object, and state information of a rasterizer for the first object.

11. The method of claim 9, wherein the determining the first usage count is based on a number of the plurality of tiles that the first object overlaps.

12. The method of claim 9, wherein the loading the first rendering context comprises:
determining whether a storage space large enough for loading the first rendering context is available in the internal memory; and
loading the first rendering context into the internal memory in response to the determination that the storage space is large enough.

13. The method of claim 12, further comprising:
determining the second usage count of the tiles for which a second rendering context is used for rendering the image, the second rendering context specifying information to render a second object in the image, wherein the second usage count is set to be a value of total usage count for the second rendering context;
determining a third usage count of the tiles for which a third rendering context is used for rendering the image, the third rendering context specifying information to render a third object in the image, wherein the third usage count is set to be a value of total usage count for the third rendering context;
updating the second usage count in response to a number of the tiles for which the second rendering context has been used to render the image, the second usage count being decreased each time the second rendering context is used to render the image; and
updating the third usage count in response to a number of the tiles for which the third rendering context has been used to render the image, the third usage count being decreased each time the third rendering context is used to render the image,
wherein the selectively loading the first rendering content further comprises:
deleting the second rendering context, when the second and third rendering contexts are stored in the internal memory, from the internal memory based on the second usage count and the third usage count in response to the determination that the storage space is not large enough; and,
loading the first rendering context into the internal memory in response to the deleting of the second rendering context from the internal memory.

14. The method of claim 13, wherein the deleting comprises selecting the second rendering context for deleting based on the second usage count having a value of "0".

15. The rendering method of claim 13, wherein the deleting comprises selecting the second rendering context for deleting based on the second usage count usage count being less than the third usage count.

16. The method of claim 9, wherein the plurality of objects specify three-dimensional (3D) graphic data.

17. At least one non-transitory computer-readable medium comprising computer readable code to control at least one processing device to implement the method of claim 9.

18. A method for tile based rendering of an image, the method comprising:
    determining, where the image is divided into tiles, a first usage count of the tiles for which a first rendering context is used for rendering the image, the first rendering context specifying information to render a first object in the image, wherein the first usage count is set to be a value of total usage count for the first rendering context;
    determining a second usage count of the tiles for which a second rendering context is used for rendering the image, the second rendering context specifying information for rendering a second object in the image, wherein the second usage count is set to be a value of total usage count for the second rendering context;
    determining a third usage count of the tiles for which a third rendering context is used for rendering the image, the third rendering context specifying information for rendering a third object in the image, wherein the third usage count is set to be a value of total usage count for the third rendering context;
    updating the second usage count in response to a number of the tiles for which the second rendering context has been used to render the image, the second usage count being decreased each time the second rendering context is used to render the image;
    updating the third usage count in response to a number of the tiles for which the third rendering context has been used to render the image, the third usage count being decreased each time the third rendering context is used to render the image;
    determining whether storage space is available in an internal memory for loading the first rendering context based on the first usage count into the internal memory;
    loading the first rendering context from an external memory into an internal memory based on whether the first usage count is larger than a second usage count;
    rendering a first tile of the image using the first rendering context, the first rendering context being provided by the internal memory in response to the first rendering context being loaded into the internal memory, and the first rendering context being provided by the external memory in response to the first rendering context not being loaded into the internal memory; and
    deleting the second rendering context, when the second and third rendering contexts are stored in the internal memory, from the internal memory based on the second usage count and the third usage count, in response to the determination that the storage space is not available.

19. The method of claim 18, wherein the determining of the first usage count is based on a number of the plurality of tiles that the first object overlaps.

20. The method of claim 18, further comprising:
    loading the first rendering context into the internal memory in response to the determination that the storage space is available.

* * * * *